United States Patent
Doebele et al.

(10) Patent No.: US 8,070,652 B2
(45) Date of Patent: Dec. 6, 2011

(54) METHOD FOR OVERCOMING TOOTH BUTT CONDITIONS WHEN ENGAGING GEARS IN TRANSMISSIONS

(75) Inventors: Bernd Doebele, Salem (DE); Norbert Wiencek, Hagnau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 495 days.

(21) Appl. No.: 12/442,821

(22) PCT Filed: Sep. 3, 2007

(86) PCT No.: PCT/EP2007/059163
§ 371 (c)(1),
(2), (4) Date: Mar. 25, 2009

(87) PCT Pub. No.: WO2008/037560
PCT Pub. Date: Apr. 3, 2008

(65) Prior Publication Data
US 2010/0041513 A1    Feb. 18, 2010

(30) Foreign Application Priority Data
Sep. 30, 2006 (DE) .......................... 10 2006 046 605

(51) Int. Cl.
- *B60W 10/00* (2006.01)
- *B60W 10/04* (2006.01)
- *B60W 10/18* (2006.01)

(52) U.S. Cl. .............................. 477/71; 477/92; 477/182
(52) U.S. Cl. ..............................................................
(58) Field of Classification Search ................... 477/70, 477/71, 75, 92, 94, 97, 98, 182, 170
See application file for complete search history.

(56) References Cited

U.S. PATENT DOCUMENTS

| | | | |
|---|---|---|---|
| 2,342,985 A * | 2/1944 | Tyken et al. | 74/339 |
| 2,993,574 A * | 7/1961 | Gardner | 74/339 |
| 3,508,450 A | 4/1970 | Richards | |
| 3,667,309 A * | 6/1972 | Franz et al. | 74/340 |
| 3,834,499 A | 9/1974 | Candellero et al. | |
| 6,769,523 B2 | 8/2004 | Muetzel et al. | |
| 7,367,923 B2 | 5/2008 | Zenno et al. | |
| 2004/0118652 A1 | 6/2004 | Muetzel et al. | |

FOREIGN PATENT DOCUMENTS

| | | |
|---|---|---|
| DE | 2246908 | 4/1973 |
| DE | 19708930 B4 | 9/1998 |
| EP | 1669270 A2 | 6/2006 |
| WO | 2006/032317 A1 | 3/2006 |

* cited by examiner

*Primary Examiner* — Tisha Lewis
(74) *Attorney, Agent, or Firm* — Davis & Bujold, P.L.L.C.

(57) ABSTRACT

The present invention relates to a method for overcoming tooth butt conditions (ZaZ) when engaging gears in transmissions. A sensitive adjustment of the clutch to apply torque for rotating the drive shaft of the transmission in order to overcome tooth butt conditions has certain limits because of the proportion of the power required and desired for making said sensitive adjustment. This may cause unpleasant jerking of the vehicle or a clearly audible locking noise of the involved positively connected elements and undesired mechanical stress to said elements.

The method according to the present invention provides a remedy due to the fact that during each shifting process, regardless of the occurrence of a tooth butt condition, the clutch is brought into a position allowing minimum predetermined torque transmission to the drive shaft of the transmission, and this torque is supported on a transmission brake, which is often already available. Due to its substantially smaller size, the transmission brake can much more quickly and accurately adjust a desired net torque curve and torque progress on the drive shaft of the transmission when a tooth butt condition occurs and thus make it significantly easier to overcome the tooth butt condition.

12 Claims, 1 Drawing Sheet

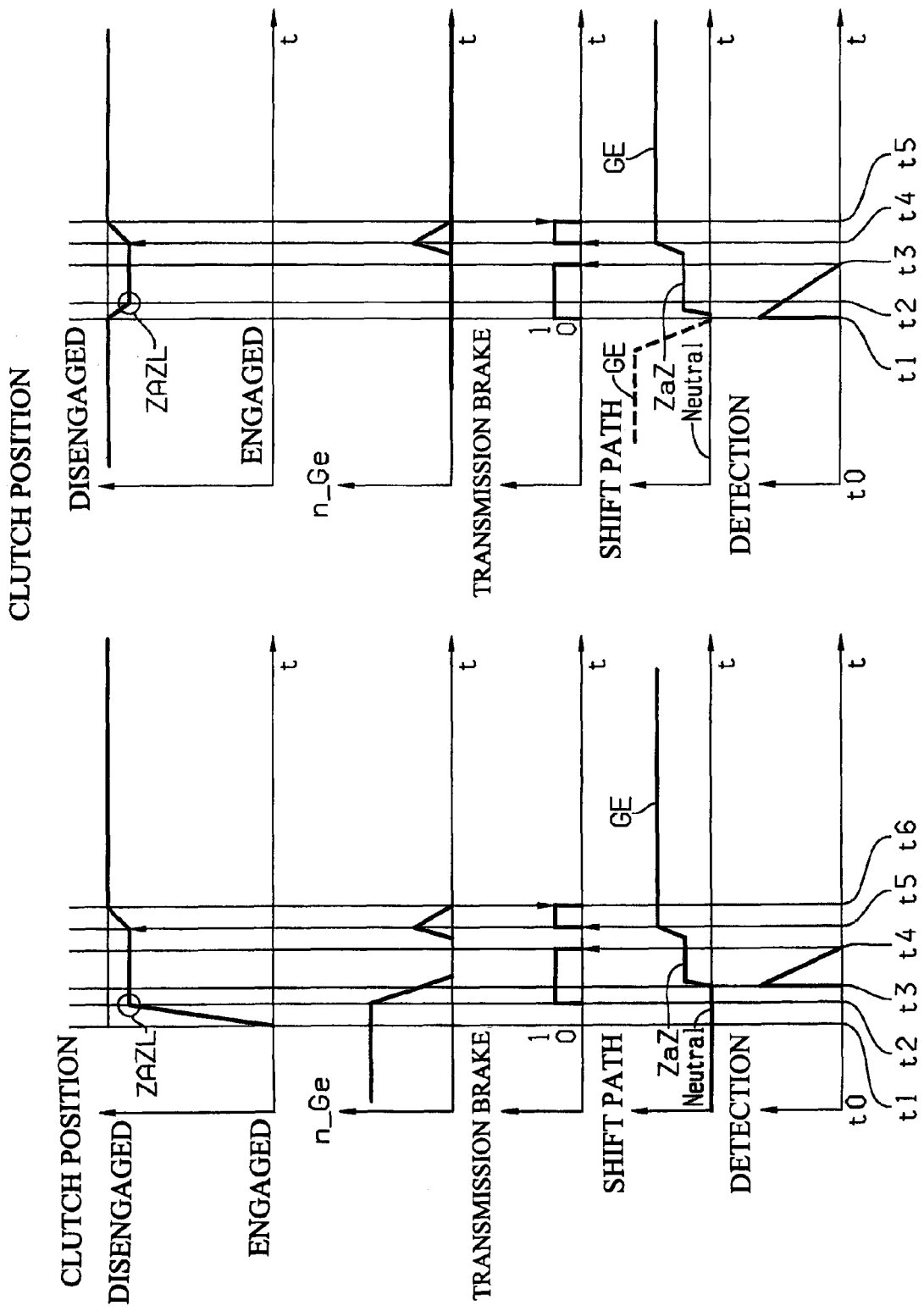

METHOD FOR OVERCOMING TOOTH BUTT CONDITIONS WHEN ENGAGING GEARS IN TRANSMISSIONS

This application is a National Stage completion of PCT/EP2007/059163 filed Sep. 3, 2007, which claims priority from German patent application serial no. 10 2006 046 605.5 filed Sep. 30, 2006.

FIELD OF THE INVENTION

The present invention relates to a method for overcoming tooth abutment conditions when engaging gears in transmissions.

BACKGROUND OF THE INVENTION

Transmissions with several gears have at least one drive shaft, which in the case of a motor vehicle is usually driven by an internal combustion engine connected to the transmission drive shaft via a shiftable clutch often configured as a dry friction clutch. The transmission output shaft is for example connected via a differential gear to the drivable wheels of the vehicle. As internal combustion engines can only be operated within a relatively low speed range, the transmission is used for adjusting the speed of the drive shaft at a given speed of the vehicle and/or at a given speed of the output shaft such that the internal combustion engine may work at the most favorable operating level.

Besides certain special forms, like e.g. continuously variable transmissions, a customary transmission for passenger cars has at least two, but mostly 4 to 7 fixed transmission ratios or gears, apart from the drive shaft and output shaft, a reverse gear with reversal of rotation direction being nearly always provided. Transmissions with even considerably more gears are used in freight vehicles.

The individual gears are either shifted when certain gear pairs (or also equivalent transmission means like belt sprockets) are shifted into the flow of torque, while other gear pairs do not actively rotate with the transmission of torque. For this purpose, certain gear wheels may be arranged displaceable but rotationally fixed on shafts and be displaced when the allocated gear is engaged such that they mesh with another gear wheel. Alternatively, the gear wheels may permanently intermesh with their allocated gear wheels, and the torque transmission between the gear wheel and the shaft supporting the gear wheel, e.g. via a shiftable claw clutch, may be shifted between a freewheel and a rotationally fixed transmission.

In both cases, it is possible that, in particular with stationary vehicles and consequently motionless output shafts, either the end faces of two teeth of gear wheels to be engaged with one another, or of claws of a claw clutch to be closed, abut one another with their elevated parts and the requested gear cannot be engaged.

In order to solve this so called tooth abutment condition, beveling the end faces of the gear wheels and/or claws to attain a radial, torsion force component from the active axial force, and at least rotating a gear wheel and/or claw further so that the gear wheels or claws neatly mesh is known. This is, however, associated with considerable production expenditure.

Furthermore, adjusting the synchronization of the involved gear wheels or claw clutches by means of different devices and methods such that meshing is aided by a rotational speed difference is known. Admittedly, the efficiency of this approach without simultaneously beveling the face ends is limited just because when the end faces touch, their friction generates a braking torque that in turn favors a tooth abutment condition. Correct shifting may in fact be favored this way, but only restrictedly guaranteed, if the shifting speed will not be set undesirably low. Therefore, there have been different proposals on how a tooth abutment condition may be overcome as rapidly as possible.

For this purpose, relative rotation of the gear wheels or claw clutches involved is required. Apart from very complex solutions with internal drives, it is presently suggested to produce this relative rotation by rotating at least one of the drive shafts or output shafts, while possibly simultaneously overcoming or at least reducing contact pressure of the gear wheels or claw clutches involved. As this has to function reliably with a standing vehicle and consequently standing transmission output shaft, and decelerating the vehicle for overcoming the tooth abutment condition is not desirable, the clutch is preferably engaged for this purpose such that torsion of the transmission drive shaft results and shifting is again attempted at the same time or immediately afterward.

The problem with this is that the torque to be transferred by the clutch for the desired positive or negative acceleration of the drive shaft depends on a large number of parameters. Among others, those parameters are the vehicle speed and the speed of the transmission output shaft depending upon it, the rotational speed of the engine output shaft and the operating level of the engine that in turn depends on the type, age and primarily the temperature of the transmission oil.

Therefore, according to the current experience, in order to be able to overcome a toot abutment condition in the transmission under all possible or usual practical conditions, the clutch has to be engaged to an extent such that even under unfavorable conditions, which require a high torque at the drive shaft for overcoming the tooth abutment condition, this torque is at least achieved. This, however, entails that in the case of tooth abutment conditions that are less difficult to overcome a still considerable torque develops, and the motor vehicle is subject to an audible and even perceptible jerk that is unpleasant for the passengers and damaging to the claws or teeth colliding with each other.

From U.S. Pat. No. 6,769,523 B2 a method has been known where a controlling device detects a tooth abutment condition and consequently continuously varies the position of the clutch until the tooth abutment condition is overcome or an abort criterion is met. More precisely, different attempts are made with different clutch positions, where the position of the clutch, starting at relatively small excursions with intervals, is displaced with more strength to its engaged position. Consequently, easy to resolve tooth abutment conditions may be overcome with low torque being transferred by the clutch, and the above described undesired effects can be to a large extent avoided. In further developments, it is provided that certain parameters, like the transmission oil temperature, are recorded and evaluated to be able to possibly adjust the most suitable clutch position for overcoming the tooth abutment condition more rapidly. Although this method represents a definite improvement compared to the previously described method, this known technical solution is not entirely satisfactory.

This is probably related to the fact that the clutch has been designed for the transmission of the maximum output of the drive engine, which makes exact positioning of the clutch for the transmission of the desired, comparatively very low amount of torque for overcoming a tooth abutment condition very difficult. In addition, the clutch is subject to considerable wear during its life time, which has to be taken into account in the same way as the rapidly changing parameters, like the operating temperature of the clutch, which may cause significant changes in the clutch behavior because of the thermal expansion in the adjustment range of interest here.

Further, the relation of the contact pressure of the friction elements to the torque to be transferred thereby may be modified by changes in the temperature of the friction surface, but also, for example, by overheating-induced vitrification, contamination of the friction surfaces or other circumstances. After all, the adjustment mechanisms of the clutch are necessarily likewise designed for the adjustment path required for the entire driving operation, whereby either a complex and thus expensive as well as potentially error-prone regulation of the clutch position is required for accurate adjustment in the currently relevant range of a relatively low torque transfer, or the positioning accuracy is quite low for the purpose described herein.

Moreover, when a tooth abutment condition is detected, the clutch has to be adjusted to a desired value in the first instance, and the engine speed as well as the torque adjusted at the same time, and/or taken into account when determining the target position of the clutch. The time span required for this purpose is short, but is still perceived as an unpleasant period by the passengers because of the repeated attempts that may be necessary to overcome the tooth abutment condition.

SUMMARY OF THE INVENTION

Against this background, the invention is based upon the objective of presenting a method for overcoming tooth abutment conditions when engaging gears in preferably non-synchronized transmissions, by means of which tooth abutment conditions may be rapidly and safely overcome with low additional constructive expenditure, whereby the aforementioned disadvantages of the prior art are to be avoided or at least minimized.

The present invention is based on the knowledge that tooth abutment conditions may definitely be overcome considerably faster, gentler and safer, if it is possible to enable the adjustment of the torque introduced in the transmission output shaft to be more precise than was possible before. Moreover, the present invention is based on the knowledge that this may advantageously be achieved by adjusting the clutch to a certain position that ensures sufficient torque transmission to the transmission drive shaft, while the actually required torque for efficiently overcoming the tooth abutment condition is metered via the control or regulation of a transmission brake acting on the transmission drive shaft.

Thus, the present invention is based on a method for overcoming tooth abutment conditions when engaging gears in transmissions, whereby the transmission is driven by a drive engine via a shiftable, automatically adjustable clutch that is controlled by a clutch control unit, having at least one drive shaft, one output shaft, at least one gear that may be shifted by means of positively locked shiftable elements as well as a transmission brake that acts on the drive shaft.

The transmissions described below are transmissions that shift the at least one gear by causing positively locked elements to mesh with one another. In the first place, they are gear wheel-based transmissions with discrete transmission ratios, which may be shifted by either the displacement of a gear wheel arranged in a rotationally fixed manner on a shaft and/or by the displacement of a claw clutch on a shaft relative to a gear wheel that is arranged stationary, but rotatable on the shaft.

In principle, however, the method is, for example, also suitable for transmissions in which, instead of a gear wheel that may selectively be rotated by a claw clutch, or which is arranged in a rotationally fixed manner on a shaft, a central clutch plate, which may be easily coupled, is provided. In short, the present invention relates to all transmissions in which the engagement of a target gear may be prevented by the collision of protruding parts of positively locked torque transmission elements. For better legibility, these states are combined below under the term tooth abutment condition.

Finally, the present invention is based on a detection mechanism for the detection of tooth abutment conditions which in the simplest case may consist of a time monitoring device and which emits a signal when the time limit between the beginning of the shift operation and the confirmation of a successful gear engagement is exceeded. This detection mechanism may obviously be provided on any place and advantageously as part of an already available device, possibly a transmission control unit. In the simplest case, the duration of the time limit may be a fixed and constant value.

To attain the above mentioned object it is provided that when an impending gear engagement is detected, the clutch control unit causes the adjustment of the clutch to an operating position, in which a specified torque of the drive engine is transferred via the clutch to the transmission drive shaft, which is equal to or smaller than a braking torque of the transmission brake that is temporary or to be adjusted.

In this way, a torque rests on the transmission drive shaft which directly or indirectly is supported by the transmission brake acting on the transmission drive shaft, and consequently in the first instance is inactive in relation to the rest of the transmission. This happens regardless of whether or not a tooth abutment condition is actually created when the gear is engaged or not, and allows for early as well as accordingly more slowly adjusted movement of the driving clutch.

With the same constructive expenditure, this allows for a more accurate clutch position, whereby it is irrelevant if a clutch engagement path, an actuator path of a clutch actuator or a target position of the clutch or of the actuator, a pressure value of an adjustment cylinder or for example a clutch output torque determined via a torque sensor are used as an adjusted variable, whereby the last mentioned alternative is obviously the most accurate and therefore preferred, at least when a corresponding torque sensor is already available in the vehicle drive train.

To the extent that no tooth abutment condition occurs in the further course of the gear engagement, a certain braking torque is in fact generated by the method described herein, and the clutch as well as the braking torque is subject to a slightly higher stress than in the prior art. Compared to the usual output demanded from the drive engine and, for example, the stress to which the clutch is subjected during a usual start-up process, the values are negligibly low. In addition, the stress conditions, in particular in those cases in which no tooth abutment condition occurs, only last a very short time, so that the increased energy consumption of the drive engine as well as the stress on the clutch in the form of a temperature increase and wear, might in any case be measurable under laboratory conditions, and should be negligible in practice.

By means of the method of the present invention, when a tooth abutment condition occurs, a defined torque develops at the transmission drive shaft, which is activated in a simple, fast and comparatively accurate manner by a reduction in the braking action of the transmission brake, and may be modulated with regard to magnitude and progress.

The main advantage is that the transmission brake is usually dimensioned at least one order of magnitude weaker than that of the clutch, with the result that, with a similar constructive expenditure for the current stress range of interest, the clutch may be adjusted to the desired value much more accurately and, because of the considerably less inert masses, faster too. In addition, a transmission brake, including the corresponding control unit, acting directly or indirectly on the drive shaft is already available in most automatic transmissions, whereby the additional constructive expenditure for the implementation of the method presented herein is close to zero in most cases, and the method may be implemented via mere additional software in already available control units.

As a further development of the present invention, it may be provided that when a tooth abutment condition is detected, the detection mechanism produces and emits signals for the adjustment of the transmission brake, which directly or indirectly may cause a reduction in the braking action of the transmission brake. In this context, it is irrelevant whether the detection mechanism emits these signals directly in the form of control signals for the actuators of the transmission brake, or for example only emits a signal to the transmission control unit, which is in charge of more calculations for controlling the transmission brake, alerting of the persistence of the tooth abutment condition.

Another further development of the method provides that the clutch control unit causes a direct or indirect adjustment of the torque transferred to the transmission drive shaft by the clutch, which is equal to or smaller than a calculated or selected maximum torque required for overcoming the tooth abutment condition.

This has the advantage that even under unfavorable conditions, the torque incident upon the transmission drive shaft is with great probability sufficient to resolve the tooth abutment condition, and a relatively time-consuming secondary adjustment of the clutch position in case of a very difficult to resolve tooth abutment condition may be dispensed with.

On the other hand, however, according to another further development of the method, it is preferable that when detecting an impending gear engagement, the clutch control unit causes direct or indirect adjustment of the torque transferred to the transmission drive shaft by the clutch, which is equal to or smaller than the calculated or selected maximum torque required for overcoming the tooth abutment condition.

In practice, this maximum torque preferred for overcoming a tooth abutment condition is basically limited by the fact that above a certain torque, required for overcoming the tooth abutment condition, a considerable collision of the meshing positively locked elements has to be anticipated, which on the one hand may damage the components involved or even other components, and on the other hand is also perceptible by the passengers in the form of a jerk or, at least, as an undesirable noise.

By combining the upper and lower limits of the torque transferred by the clutch to the transmission drive shaft, a torque range for the adjustment of the torque to be transferred by the clutch, is at best obtained, that definitely may be determined dependent, for example, on the transmission oil temperature and the respective target gear. In most cases, however, the selection of a fixed value within the above described range should be sufficient.

In unfavorable cases, when the desired maximum torque for overcoming a tooth abutment condition is lower than the torque required under unfavorable conditions, it is advisable to limit the maximum torque to the maximum desired torque and if this was exceptionally not sufficient to overcome the tooth abutment condition, alternative solutions to the problem, like interim shifting to another gear should be provided.

For controlling or regulating of the release and/or opening of the transmission brake it is advantageous if the detection device produces and emits signals for adjustment of the transmission brake when a tooth abutment condition is detected such that the braking action of the transmission brake is reduced in the first instance by a first value for a predetermined first time, and if the persistence of the tooth abutment condition is detected, the braking action is further opened with increasing time.

In this connection, the first value may for example be selected such that on the one hand a considerable portion of the tooth abutment conditions occurring during operation may be overcome, and that on the other hand the torque applied to the positively locked elements with a tooth abutment condition is so low that overcoming the tooth abutment condition is not or hardly perceptible to the driver or passengers. In this case, depending on vehicle design, considerably higher values for releasing the transmission brake may be provided, for example, for vehicles designed as tightly sprung, high performance for a rather sporty way of driving than for vehicles that are designed for quite economical operation with driving comfort.

If the transmission brake is released by the detection mechanism at a constant increment with increasing time, there is the advantage that in the event that tooth abutment conditions are more frequent and less difficult to resolve, the release of the transmission brake may be adjusted relatively exactly with regard to the respective situation, whereas with tooth abutment conditions that are less frequent but are more difficult to overcome, a still relatively sufficient value for releasing the transmission brake may be achieved.

On the other hand, in certain cases it may be advisable that with increasing time, the detection mechanism releases the transmission brake at decreasing increments. In this way, most of the tooth abutment conditions resulting from the initially high increments of change during the release of the transmission brake may be overcome relatively rapidly, whereas a further reduction of the braking action of the transmission brake takes place more slowly only with very difficult to overcome tooth abutment conditions, which is advantageous, particularly with regard to the effects that are perceptible by the passengers, like noise and vibrations, as well as to the stress on the components.

A combination of both above described characteristics is further possible and often especially favorable: First of all, positioning travel value for the release of the transmission brake is selected, which is capable of releasing a considerable proportion of the tooth abutment conditions occurring without the driver perceiving this or representing significant stress on the components involved. Subsequently, the positioning travel value for the release of the transmission brake is increased at relatively high and/or escalating increments as far as this does not cause unpleasant affects to the drive or passengers. A great part of the tooth abutment conditions not yet overcome may also be resolved this way.

If, however, the tooth abutment condition should still persist, the value by which the transmission brake is further released is increased only at low and/or decreasing increments, as this is the range in which the release causes the affects that may distinctly be perceived by the passengers as vibrations and noise as well as in part may represent considerable stress on the involved components. In this respect, stress minimization is therefore given priority over the speed at which the tooth abutment condition is overcome.

According to another further development of the method, it is provided that the detection mechanism produces and emits signals on detection of a tooth abutment condition for the adjustment of the transmission brake that may result in intermittent opening and closing of the transmission brake. The existing tooth abutment conditions may often be overcome by modulating braking action of the transmission brake with a lower torque than would be the case with a slow and continuous release of the transmission brake. It is obviously especially advantageous to combine this further development with the variants described above.

If the detection mechanism can modify the positioning travel magnitude and/or the progress of the release of the transmission brake dependent on the driver's request, an accurate adjustment to the individual driver requests is thus possible. This may for example be achieved in that, by activating a potentially already available change-over switch, these values are automatically modified for a more sporty and/or comfortable way of driving, or are arranged to be adjustable by programming a control unit by the driver or in a workshop.

It is likewise advantageous if, on adjustment of the transmission brake, the detection mechanism takes into account the gear to be engaged, the transmission temperature and/or transmission oil temperature. Thus, the initial positioning travel value by which the transmission brake is released may be increased with a lower measured, otherwise determined or also estimated transmission oil temperature and reduced with a high transmission oil temperature. As far as it turns out that tooth abutment conditions are on average more difficult to overcome with certain target gears than with other target gears, this may also be accordingly taken into account.

Another further development of the method according to the present invention involves the behavior of the clutch after overcoming a tooth abutment condition, or the case in which no tooth abutment condition has occurred. If the detection mechanism emits a signal on detection of trouble free engagement of the transmission elements of the target gear to be coupled, causing the clutch control unit to release the clutch at a predetermined value, the low, but still additional, stress induced by the method on the drive engine and the clutch is overcome as soon as possible.

It is obviously appropriate to correspondingly reduce the braking action of the transmission brake at the same time, in order to prevent the resulting braking torque to act on the driven vehicle wheels. Considering the relatively few brake lines of the transmission brake, a relatively simple control unit will suffice for reversing the braking action of the transmission brake.

On the other hand, it is likewise advantageous if the detection mechanism emits a signal when engaging the transmission components of the target gear to be coupled is detected, which results in an extensive compensation of the torque induced by the clutch by the braking action of the transmission brake. Optimally, then, the clutch is released after engaging the gear, and the considerably faster selectable transmission brake is actuated for the time required by the release of the clutch for immediately compensating the still developing torque. As soon as the clutch no longer transfers a significant torque to the transmission, the transmission brake is released again.

Thus, although during a shift operation with a running vehicle, a certain braking action is applied to the vehicle for a short time which in practice is at most hardly perceptible, it is certainly avoided that during a shift operation with a still standing vehicle the drive torque introduced via the clutch is higher than the braking torque absorbed by the transmission brake and the vehicle possibly inadvertently rolls off and/or rolls off faster than desired by the driver. In this case, it is obviously also possible to include other parameters, like the target gear or the vehicle speed in order to further optimize the overall behavior.

BRIEF DESCRIPTION OF THE DRAWINGS

The present invention may further be explained by means of an embodiment. For this purpose, drawings have been attached to the description, wherein:

FIG. 1 shows the progress of the clutch position, the transmission brake and other parameters on gear engagement with a rolling vehicle and FIG. 2 shows the progress of the clutch position, the transmission brake and other parameters on gear engagement with a standing vehicle.

DETAILED DESCRIPTION OF THE PREFERRED EMBODIMENTS

The method according to the present invention may be used in a motor vehicle with a drive train largely known from FIGS. 1 and 2 of U.S. Pat. No. 6,769,523 B2 discussed at the beginning. In that case, the drive engine of the vehicle is connected to a manual transmission via a clutch. In addition, a transmission brake is available in the drive train by means of which the transmission drive shaft may at least be decelerated. The actuation of the clutch and the transmission brake as well as of the transmission actuators and coupling means to be activated by a pressurizing medium required for a gear shift are controlled by an electronic control unit.

This control unit also serves as a detection mechanism for detecting tooth abutment conditions of gear wheels and/or of gear wheels with allocated coupling means in the transmission, has related assessment programs and is connected to the sensors required for this purpose. Besides, a control program for overcoming tooth abutment conditions is stored in this control unit, which operates according to the method of the invention.

FIG. 1 shows the clutch position over the course of time, and the state of the transmission brake and other parameters during gear engagement when the vehicle is rolling. More precisely, in the Drawings, a first upper axis shows the position of a clutch over time, an axis arranged below designated with n_Ge shows the speed of the transmission drive shaft over time, a third axis outlines the shifting position of a transmission brake, on a fourth axis arranged underneath the shift path of the involved gear wheels and/or coupling means inside the transmission is shown, and finally, the bottom axis identified with the term "detection" outlines the status of a so called detection mechanism. This detection mechanism is preferably a software module in the above mentioned electronic control unit. The time axes are all outlined on the same scale, so that the especially identified times t0 to t6 correspond to the respective same time point on all axes.

It is assumed that at the moment t0, the second gear is engaged in an automated non-synchronized transmission of a passenger motor vehicle with automated drive clutch as well as with a transmission brake, and that the vehicle is moving in the forward direction a speed of 40 kg/h. In that case, the drive clutch is engaged. The speed of the transmission drive shaft results from the driving speed as well as from the transmission ratio of the selected gear and at that time matches the output speed of the drive engine because the clutch is engaged. The transmission brake is not activated, and the gear wheels of the herein considered third gear are in the neutral position in which they do not transfer any torque.

At time T1 a gear change to third gear is introduced. For this purpose, the drive gear is released from this time until it is in a tooth abutment-resolving position, designated with ZAZL according to the present inventions, at time t2. The rest of the parameters remain within the time span between t1 and t2, where the engine control unit naturally reduces the injection amount in the usual manner in order to adjust the drive engine to a desired speed.

At time t2, the opening of the clutch to the desired tooth abutment-resolving position (ZAZL) is concluded, and the drive engine transfers a small amount of torque to the transmission drive shaft via the nearly disengaged clutch depending on the speed difference between the input and output side of the clutch. At the same time, the transmission brake is engaged, whereby the speed of the transmission drive shaft decreases, and a certain, small torque is still transferred to the transmission drive shaft, which is supported by the transmission brake, via the drive clutch.

At time t3, the actual shift operation starts, and the detection mechanism monitors if the shift operation is concluded within a specified time. Shortly afterward, the gear wheels of the target gear should have meshed, and thus the gear change has largely been concluded on the transmission side.

In this case, however, a tooth abutment position is generated (ZaZ), as may be seen in the diagram of FIG. 1, which is detected by the detection mechanism. After a certain waiting time between t3 and t4, this detection mechanism causes the release of the transmission brake at time t4 (shift position=0), whereby the torque provided by the drive clutch can no longer be supported by the transmission brake and subsequently acts on the transmission drive shaft, whereby the tooth abutment condition may be resolved after a short time by rotating the transmission drive shaft. This is on the one hand apparent from the diagram of the shift path, and on the other from the acceleration of the transmission drive shaft between times t4 and t5. The rotational speed of the transmission drive shaft is represented in this connection as excessively high for reasons of conciseness.

As soon as the resolution of the tooth abutment condition (ZaZ) is recognized by the detection mechanism or the transmission control unit at time t5, the clutch is disengaged to a predetermined value, at which essentially no torque is transferred via the clutch. At the same time, the transmission brake is once more activated at time t6 (shift position=1) in order to avoid that during the time required for a complete clutch release the torque still supported by the transmission drive shaft becomes noticeable as an acceleration of the vehicle.

At time t6 the shift operation is concluded on the transmission side (gear engaged=GE), the transmission drive shaft stands still (n_Ge=0) and the vehicle may be operated any time in the selected new gear by engaging the drive gear and correspondingly activating the drive engine.

FIG. 2 shows the processes during the engagement of a gear from the standing position of the vehicle by means of the same parameters plotted. At time t0 and until time t1, the clutch is disengaged. The transmission drive shaft is standing still, the transmission brake is released and the gear wheels and/or coupling means of the first gear, which are of interest in this case, are in the neutral position in which they do not transfer any torque. In this connection, however, it is possible that immediately after the vehicle is stopped, a previously engaged gear (GE) is disengaged. As in this case, however, the gear wheels are different, this process is shown with a dotted line.

At time t1 the engagement of first gear starts. For this purpose, the clutch is placed in the tooth abutment overcoming position (ZAZL), and the detection mechanism starts monitoring if the target gear is engaged within a predetermined time span. At the same time, the transmission brake is activated to engage state in order to support the building up torque of the drive engine acting on the transmission drive shaft via the clutch. At time t2 the positioning of the clutch is concluded and the gear wheels and/or coupling means to be meshed are in a tooth abutment condition (ZaZ).

After the detection mechanism has waited for a certain time whether the tooth abutment condition (ZaZ) is resolved by itself, the transmission brake is released at time t3, as a result of which the transmission drive shaft starts rotating as a consequence of the developed small torque of the clutch, which causes the tooth abutment condition (ZaZ) to be overcome shortly before time t4. This is detected by the detection mechanism, which consequently causes the disengagement of the clutch at time t4 and at the same time engages the transmission brake (shift position=1) until complete disengagement of the clutch, in order to again decelerate the drive shaft to stand still. As soon as the clutch is completely disengaged and the transmission drive shaft is decelerated to a standstill (n_Ge=0), the transmission brake is again released. First gear is now engaged (GE) and may be used any time by engaging the clutch as well as by simultaneously activating the internal combustion engine.

REFERENCE NUMERALS

GE gear engaged
N_Ge speed of the transmission drive shaft
t time
ZaZ tooth abutment condition
ZAZL tooth abutment-resolving position

The invention claimed is:

1. A method for overcoming tooth abutment conditions when engaging gears in a transmission which is driven by a drive engine via a shiftable, automatically adjustable clutch that is activated by a clutch control unit, the transmission having at least a drive shaft, an output shaft, and one gear that is shiftable by positively locked shiftable elements, and a transmission brake that acts on the drive shaft, and a detection mechanism which detects tooth abutment conditions, the method comprising the steps of:
adjusting the clutch, via the clutch control unit, to an actuating position when detecting an impending gear engagement, in which a predetermined torque is transferred from the drive engine, via the clutch, to the transmission drive shaft, and the predetermined torque is one of less than or equal to a braking torque actuated by the transmission brake, which is one of temporary or adjustable; and
producing with and transmitting from the detection mechanism signals which cause a reduction of braking action, either directly or indirectly, by adjusting the transmission brake when a tooth abutment condition is detected.

2. The method according to claim 1, further comprising the step of adjusting, either directly or indirectly with the clutch control unit, the torque transferred to the transmission drive shaft by the clutch such that the torque is either equal to or greater than one of a calculated or a selected maximum torque that is required for eliminating the tooth abutment condition.

3. The method according to claim 1, further comprising the step of adjusting, either directly or indirectly with the clutch control unit when detecting an impending gear engagement, the torque transferred to the transmission drive shaft by the clutch such that the torque is either equal to or smaller than a preferred calculated or a selected maximum torque for eliminating the tooth abutment condition.

4. The method according to claim 1, further comprising the step of producing with and transmitting from the detection mechanism, when detecting a tooth abutment condition, signals for adjustment of the transmission brake which, directly or indirectly, cause a reduction in the braking action of the transmission brake such that the braking action is first reduced by a predetermined value for a first predetermined time and, if the detection mechanism detects a continuance of the tooth abutment condition, the braking action is further reduced with increasing time.

5. The method according to claim 4, further comprising the step of releasing the transmission brake with the detection mechanism at constant increments with increasing time.

6. The method according to claim 4, further comprising the step of releasing the transmission brake with the detection mechanism at increasing increments with increasing time.

7. The method according to claim 4, further comprising the step of releasing the transmission brake with the detection mechanism at decreasing increments with increasing time.

8. The method according to claim 4, further comprising the step of producing with and transmitting from the detection mechanism signals, when a tooth abutment condition is detected, which cause the transmission brake to intermittently engage and disengage.

9. The method according to claim 1, further comprising the step of modifying at least one of a magnitude and a progression of disengaging the transmission brake depending upon a driver's request.

10. The method according to claim 1, further comprising the step of considering, with the detection mechanism, at least one of a gear to be engaged, a transmission temperature and a transmission oil temperature when actuating the transmission brake.

11. The method according to claim 1, further comprising the step of transmitting a signal from the detection mechanism that causes the clutch control unit to disengage the clutch to a predetermined value when transmission components of a target gear to be coupled begin engaging.

12. The method according to claim 1, further comprising the step of transmitting a signal from the detection mechanism which causes extensive compensation of the torque transferred by the clutch by the braking action of the transmission brake, when transmission components of a target gear to be coupled begin engaging.

* * * * *